US006899441B2

(12) United States Patent  (10) Patent No.: US 6,899,441 B2
Chen  (45) Date of Patent: May 31, 2005

(54) MULTIFUNCTION WARNING DEVICE

(76) Inventor: Hsiu Chin Chen, No.6, Alley 12, Lane 9, Sec. 2, Changping Rd., Beitun District, Taichung City 406 (TW)

( * ) Notice: Subject to any disclaimer, the term of this patent is extended or adjusted under 35 U.S.C. 154(b) by 73 days.

(21) Appl. No.: 10/633,420

(22) Filed: Aug. 4, 2003

(65) Prior Publication Data

US 2005/0030745 A1 Feb. 10, 2005

(51) Int. Cl.[7] .......................... A63B 15/02; F21L 4/02; F21L 13/06
(52) U.S. Cl. ................. 362/102; 362/184; 362/190; 362/192; 362/250; 340/321
(58) Field of Search ................. 362/102, 183, 362/184, 190, 192, 193, 228, 238, 239, 250, 362/388, 486; 340/321

(56) References Cited

U.S. PATENT DOCUMENTS

| | | | |
|---|---|---|---|
| 1,484,493 A * | 2/1924 | Hargot | 362/192 |
| 2,237,536 A * | 4/1941 | Wells, Jr. | 340/321 |
| 5,079,679 A * | 1/1992 | Chin-Fa | 362/102 |
| 5,319,365 A * | 6/1994 | Hillinger | 340/321 |
| 5,630,660 A * | 5/1997 | Chen | 362/183 |
| 5,690,418 A * | 11/1997 | Hsiung | 362/388 |
| 6,089,727 A * | 7/2000 | Wu | 362/102 |
| 6,099,142 A * | 8/2000 | Liu | 362/184 |
| 6,206,541 B1 * | 3/2001 | Landamia | 362/184 |

* cited by examiner

*Primary Examiner*—Alan Cariaso
(74) *Attorney, Agent, or Firm*—Birch, Stewart, Kolasch & Birch, LLP.

(57) ABSTRACT

A multifunction warning device can be used as a flashlight, a warning sign and an illuminating traffic baton. The multifunction warning device mainly contains: a manual power generator, a lamp, a seat, a storage battery, and plural legs. The lamp is secured and electronically connected to a head end of the manual power generator. The seat is connected the manual power generator. The seat has a socket therein. The storage battery has an automobile charging connector removably attached to the socket of the seat. Each of the plural legs contains: a longitude frame and a light pervious shell. The longitude frame has plural LEDs thereon. The longitude frame is pivotally secured to the seat. The light pervious shell is fastened to the longitude frame. The plural legs can be assembled to a baton body.

13 Claims, 8 Drawing Sheets

MULTIFUNCTION WARNING DEVICE

TECHNICAL FIELD

This invention relates generally to a warning device, in particular, a multifunction warning device having features of being a flashlight, a warning sign and an illuminating traffic baton.

BACKGROUND OF THE INVENTION

A conventional warning device is a triangle frame on which a reflective material is adhered such that when a car accident happened or a car is out of order, the driver puts the warning device on a position behind of the car at a certain distance for warning the following cars not to drive in this same line to prevent a possible accident. However, the conventional warning device has only one feature and the reflection function may be reduced in a fog area or a dark area and possibly be omitted because of its small occupation.

A conventional multi-purposes warning device includes a battery container, a tube threadedly engaged to an end of the battery container and a flash bulb disposed in the tube, a bracket pivotally engaged to the tube and a flashlight head pivotally engaged to the bracket, a socket slidably mounted to the battery container and the tube, three legs each has an end pivotally connected to the socket and a stick respectively and pivotally connected between the inner side of each of the legs and an outer periphery of the battery container, such that the three legs can be arranged to be a triangle warning sign and the flash bulb provides a flash light. However, the conventional multi-purposes warning device cannot be used as a traffic baton. In addition, the warning effect is not good enough because the legs as a warning sign cannot illuminate by itself.

None of the conventional warning device has a battery that can be recharged through different ways. Therefore a multifunction warning device that can be used as a flashlight, a traffic warring sign and illuminating traffic baton and at the same time its battery can be recharged manually as well as through automobile charging system is needed.

SUMMARY OF INVENTION

It is therefore an objective of the present invention to provide a multifunction warning device that can be used as a flashlight, a traffic warring sign and illuminating traffic baton.

Another object of the invention is to provide a multi function warning device with a battery that can be recharged manually or through automobile charging system.

The present invention, briefly summarized, in one embodiment discloses a multifunction warning device, which mainly contains: a manual power generator, a lamp, a seat, a storage battery, and plural legs. The lamp is secured and electronically connected to the manual power generator. The seat is connected to the manual power generator. The seat has a socket therein. The storage battery has an automobile charging connector removably attached to the socket of the seat. Each of the plural legs contains: a longitude frame and a light pervious shell. The longitude frame has plural LEDs thereon. The longitude frame is pivotally secured to the seat. The light pervious shell is fastened to the longitude frame. The plural legs can be assembled to a baton body.

BRIEF DESCRIPTION OF DRAWINGS

The invention will be more clearly understood after refer to the following detailed description read in conjunction with the drawings wherein.

DETAILED DESCRIPTION OF PREFERRED EMBODIMENTS

Figure 1:
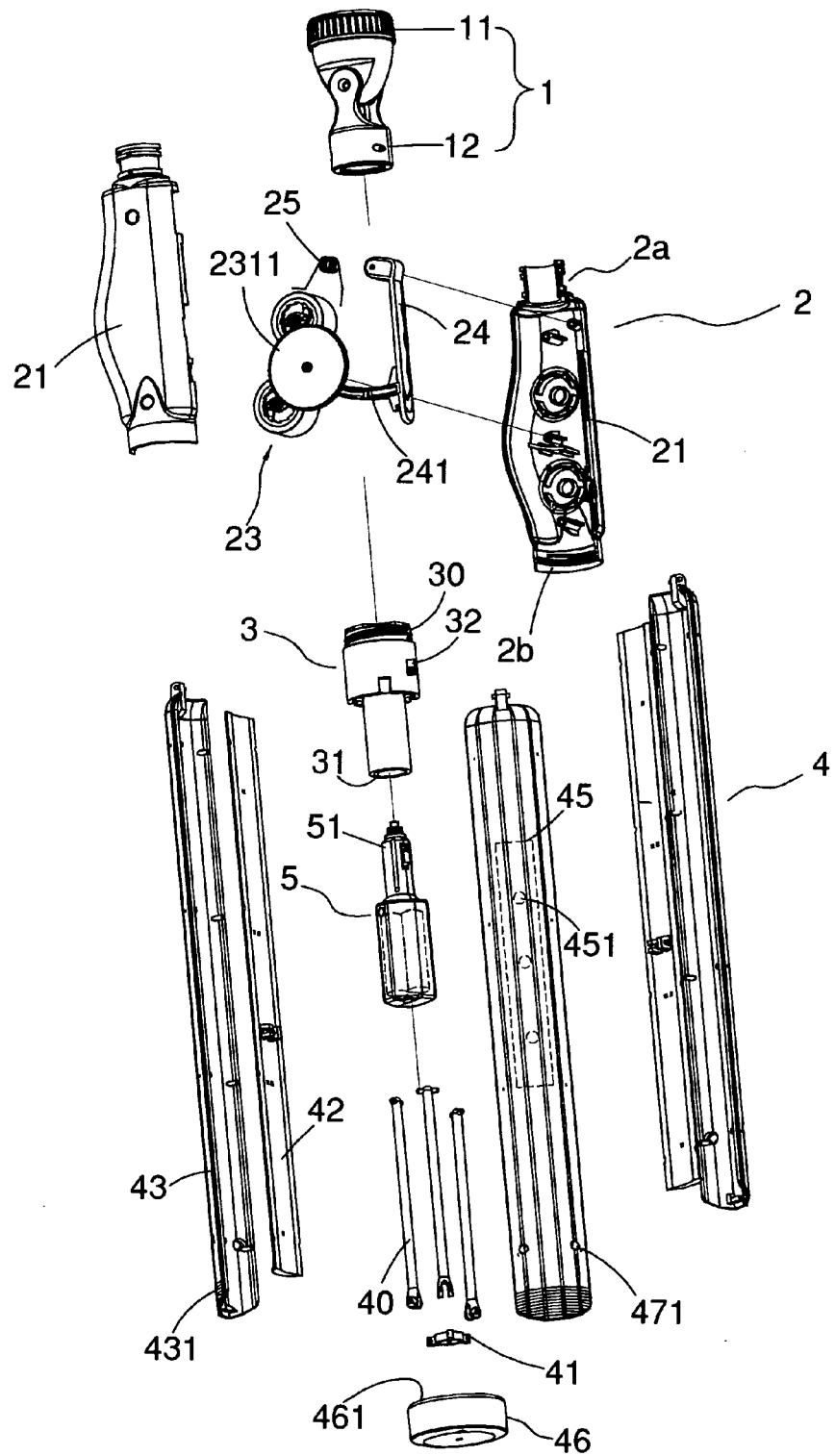
FIG. 1 is an exploded view of an embodiment.
Figure 2:
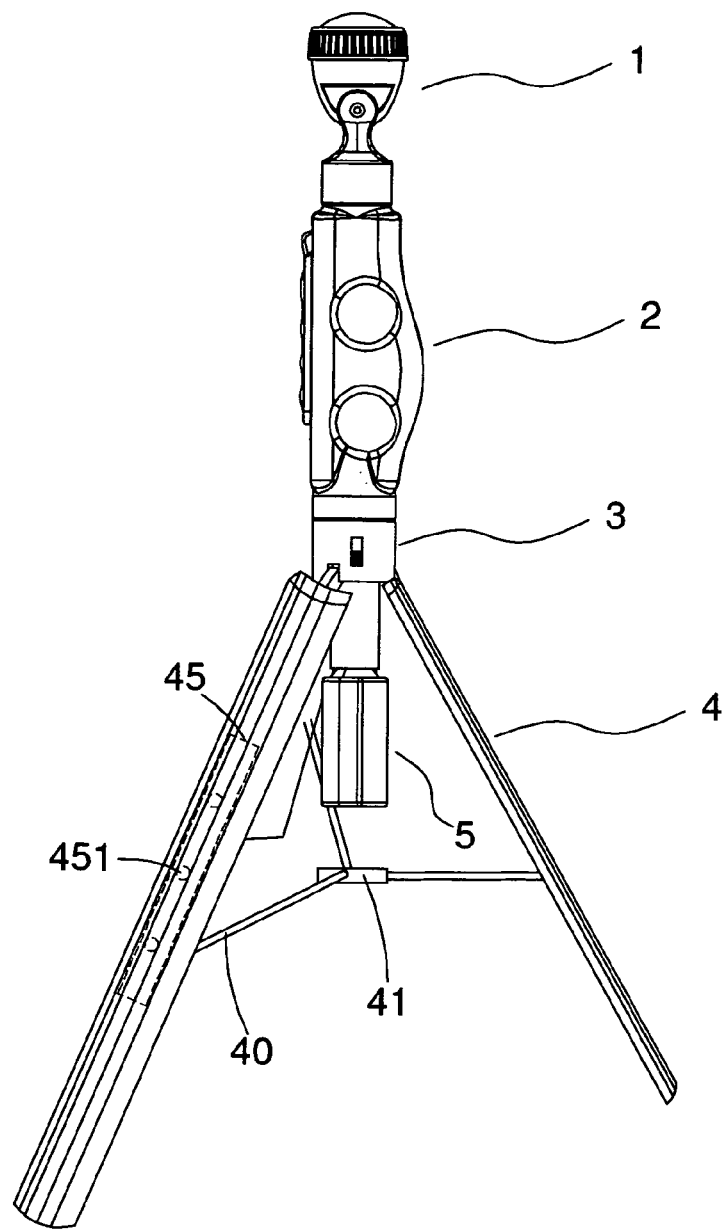
FIG. 2 is a perspective view the assembled embodiment.
Figure 3:
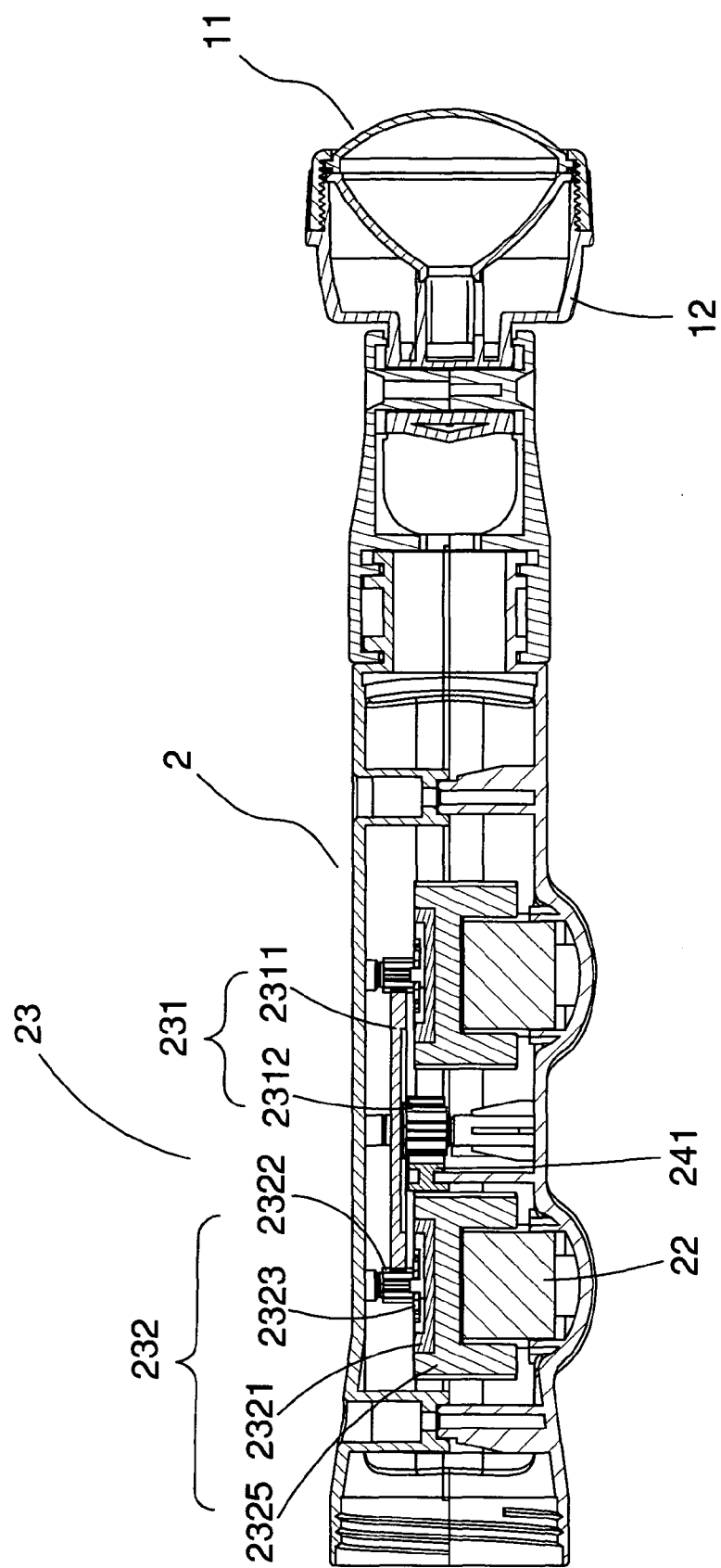
FIG. 3 is a cross sectional view of the lamp assembled with the manual power generator of the embodiment.
Figure 8:
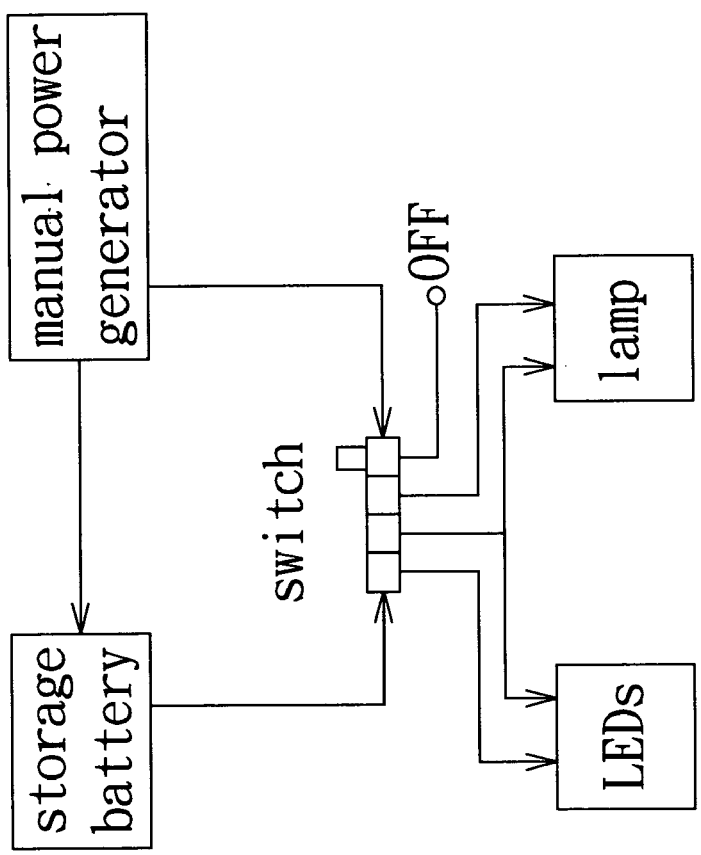
FIG. 8 is a functional block diagram demonstrating circuit switching between the lamp and the LEDs.

With reference to FIG. 1, a multifunction warning device mainly contains: a manual power generator 2, a lamp 1, a seat 3, a storage battery 5, three legs 4 and a switch 32. The lamp 1 contains a bracket 12 connected to the head end 2a of the manual power generator 2 and a lamp head 11 hinged to the bracket 12. The lamp head 11 is electrically connected to the manual power generator 2. The seat 3 is threadedly engaged with a rear end 2b of the manual generator 2. The seat 3 has a socket 31 at a rear end therein. The storage battery 5 has an automobile charging connector 51 removably attached to the socket 31 of the seat 3. Electricity can be delivered from the manual power generator 2 to the storage battery 5 through the automobile charging connector 51 and electricity can also be delivered from the storage battery 5 through the manual power generator 2 to the lamp 1. The power generator 2 can also directly provide electricity to the lamp 1. The seat 3 is detachable from the storage battery 5. The storage battery 5 can also be recharged by plugging the automobile charging connector 51 into an automobile charging socket in an automobile. Each of the three legs 4 contains: a longitude frame 42 and a light pervious shell 43. A circuit board 45 having plural LEDs 451 thereon is mounted on the longitude frame 42 for controlling blinking frequencies of the LEDs 451. The longitude frame 42 is pivotally secured to the seat 3. The light pervious shell 43 is fastened to the longitude frame 42. The light previous shell 43 has threaded portion 431 at the end thereof. The light pervious shell 43 is made of a material that can reflect light. The switch 32 mounted on the seat 3, is for controlling illuminations of the lamp 1 and the LEDs 451. A bottom cover 46 having an inner threaded periphery 461 for threadedly engaged with the threaded portions 431 of the light pervious shells 43, thereby assembling the three legs 4 to a baton body. Referring to FIG. 8, the switch 32 can switch on/off statuses of the lamp 1 and the LEDs 451.

Figure 7:
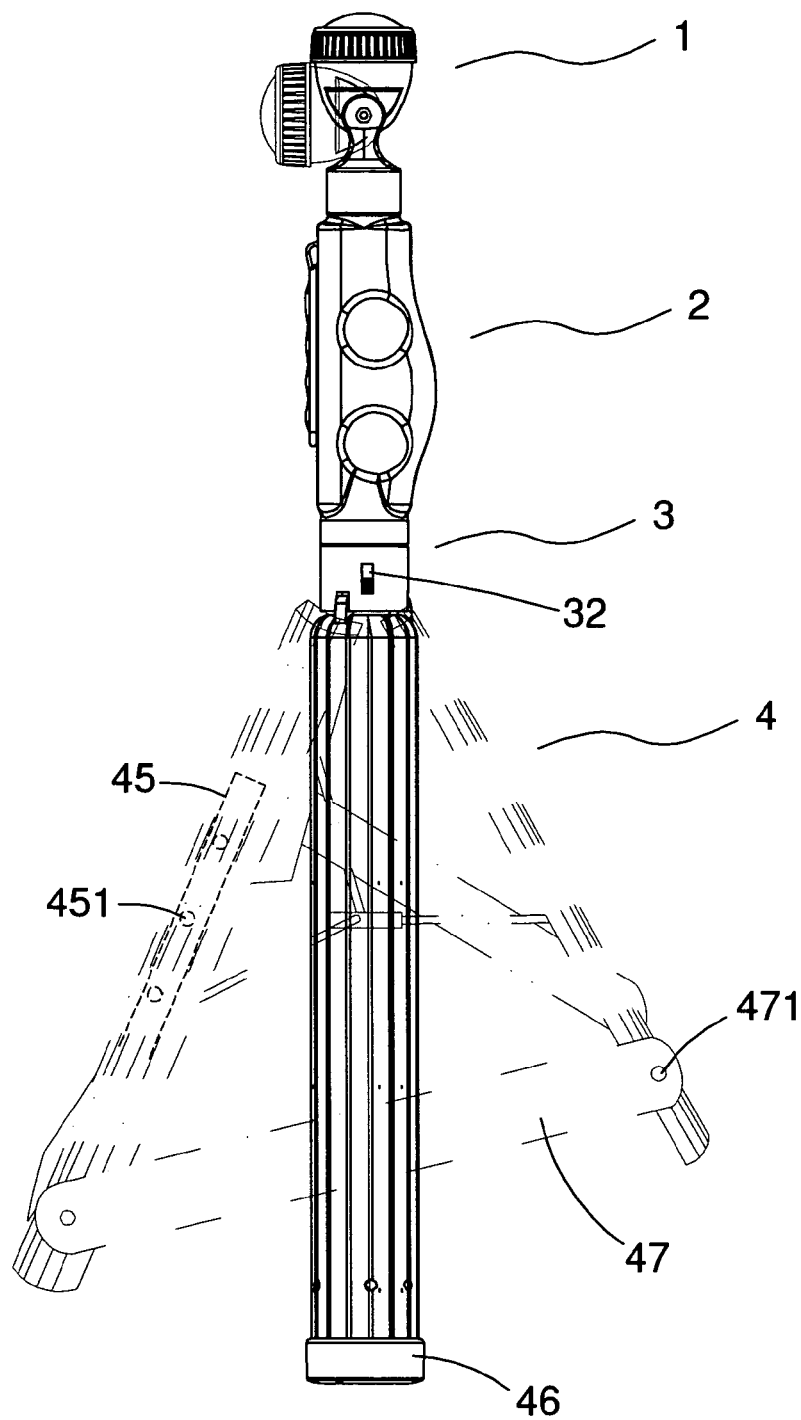
FIG. 7 is a perspective view of another embodiment using bars for enhancing the strength of the legs are used.

Each the leg 4 contains a rod 40 pivotally connected to middle portion of the longitude frame 42 with one end and connected to a ring 41 with the other end. Hence, when the legs 4 are stretched, the rods 40 with the ring 41 can restrain movement of the legs 4. Referring to FIG. 7, another embodiment of the invention, contains plural bars 47 engaged between holes 471 at lower portions of the legs 4 for enhancing the strength of the legs 4.

Figure 4:
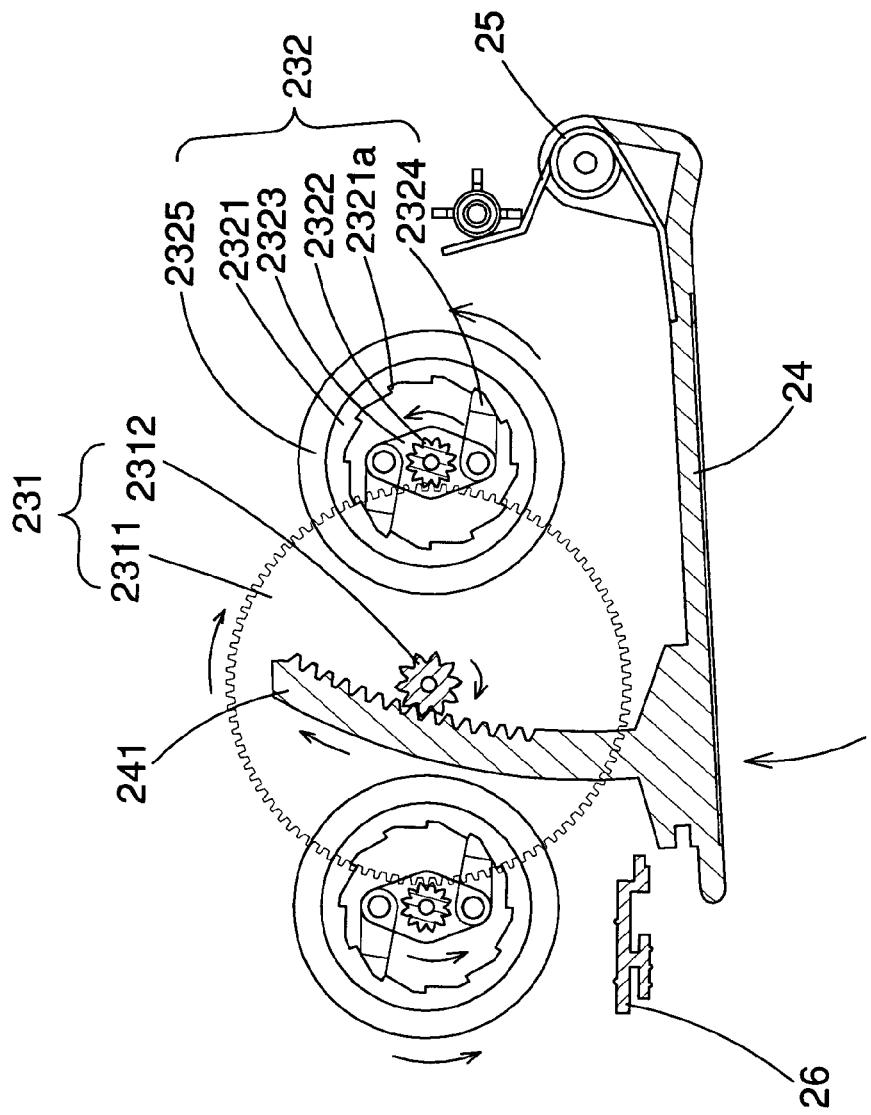
FIG. 4 is a perspective view demonstrating the movements of the driving set of the manual power generator when the handle is pressed.
Figure 5:
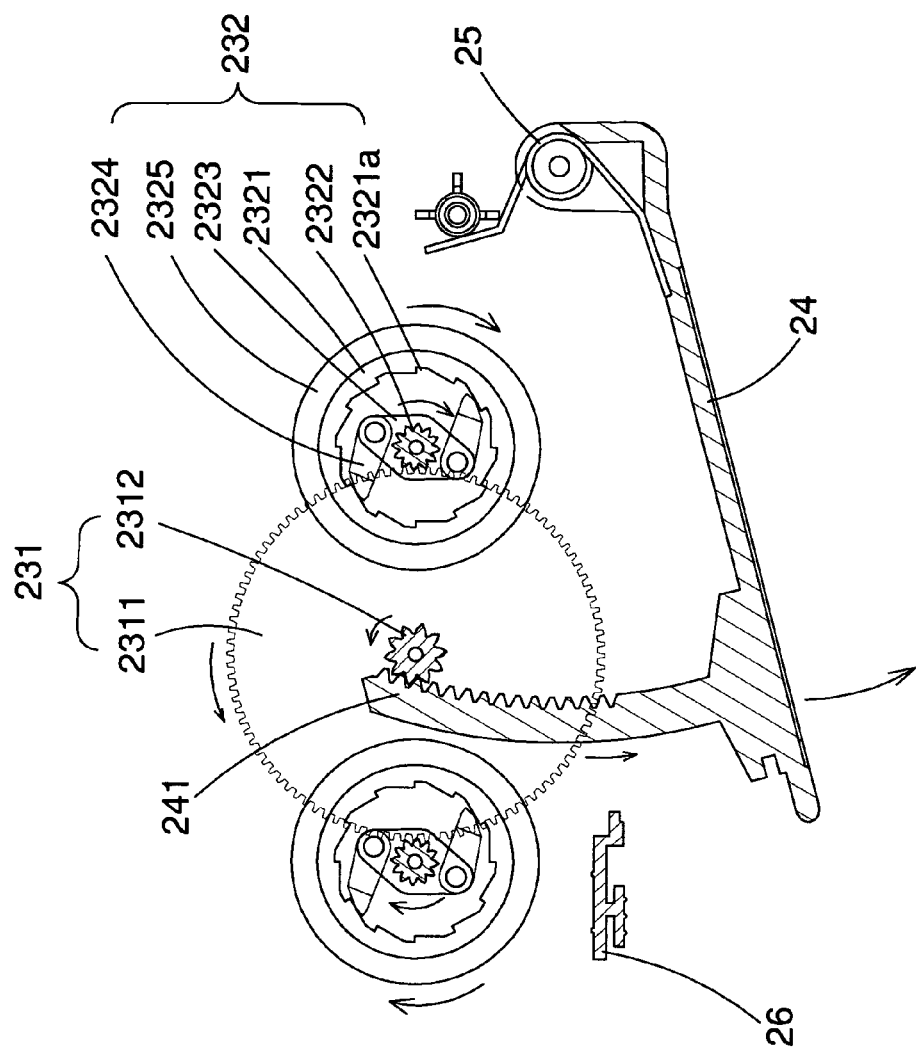
FIG. 5 is a perspective view demonstrating the movements of the driving set of the manual power generator when the handle is released.
Figure 6:
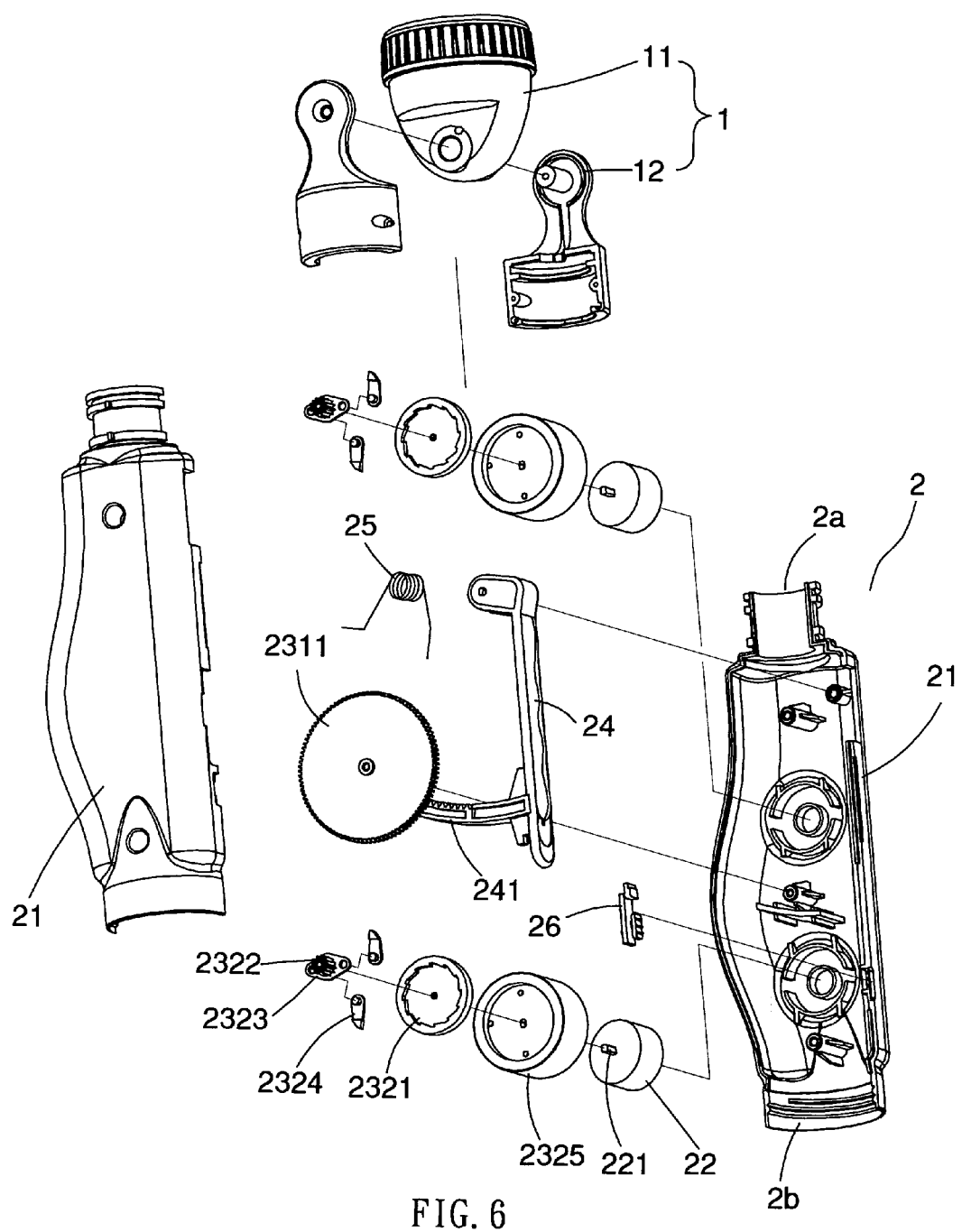
FIG. 6 is a detailed exploded view of the manual power generator.

With reference to FIGS. 4 to 6, the manual power generator 2 mainly contains: a housing 21, a power generating unit 22, a driving set 23, a handle 24 and a spring 25. The power generating unit 22 is installed interior of the housing 21 for generating electric power. The driving set 23 is installed interior of the housing 21 and formed by a plurality of speed changing gears for driving the power generating unit 22. The power generating unit 22 transfers mechanic power to electric power. The handle 24 has an end pivotally installed in front of the housing 21 for driving the driving set 23. The spring 25 is installed within the housing 21 for resisting against the handle 24, thereby the handle 24 can be restore automatically. The handle 24 has a cambered rack 241 at the end thereof. A fastener 26 is installed on the inner surface of the housing for receiving the handle 24 in order the handle 24 to be in alignment with the surface of the housing 21 when the manual power generator 2 is not used. The driving set 23 contains a first speed changing gear 231, two second speed changing gears 232. The first speed changing gear 231 contains a first gear 2311 and a first pinion 2312 engaged with the cambered rack 241. The first gear 2311 and the first pinion 2312 are coaxially mounted. The second speed changing gear contains a second gear 2321, a second pinion 2322 engaged with the first gear 2311, a prism plate 2323 having two blocks 2324 pivotally connected thereto, and a rotary wheel 2325 coaxially secured to the second gear 2321. The prism plate 2323 is mounted integrally with the second pinion 2322. The inner wall of the second gear 2321 has several teeth grooves 2321a. Each tooth in the groove 2321a has a vertical stopping wall. The rotary wheel 2325 is coaxially secured to an input axis 221 of the power generating unit 22.

With reference to FIG. 4, the transmission process is described as follows: when the handle 24 is pressed, the cambered rack 241 drives the first pinion gear 2312 to rotate clockwise. Since the first pinion 2312 and the first gear 2311 are mounted integrally, they rotate synchronously. The fist gear 2311 drives the second pinion 2322 to rotate counterclockwise. Since the second pinion 2322 and the prism plate 2323 are mounted integrally, they rotate synchronously. Because of the centrifugal force effect caused by the rotation of the prism plate 2323, the two blocks engage with the teeth grooves 2321a against the vertical stopping wall. The two blocks then drives the second gear 2321 and the rotary wheel 2325 rotate. Then, the rotary wheel 2325 drives the input axis 221 of the power generating unit 22. Accordingly the power generating unit 22 is driven.

With reference to FIG. 5, when the handle 24 is released, the spring 25 rejects the handle 24 to move counterclockwise. The first pinion 2312 and the first gear 2311 rotate counterclockwise and the second pinion 2322 and the prism plate 2323 rotate clockwise. The two blocks 2324 are stretched because of the centrifugal force effect. Unlike when the prism plate 2323 rotates counterclockwise, the two blocks slides off the teeth grooves 2321a. Accordingly, the second gear 2321 and the rotary wheel 2325 cannot be driven when the handle 24 is released. Therefore the second gear, the rotary wheel 2325 and the input axis 221 of the power generating unit 22 can only rotate in the same direction. When the handle 24 is held and pressed continuously, the cambered rack 241 drives the driving set 23. Because of the gear ratio effect, the rotary speed of the input axis 221 of the power generating unit 22 is increased through the driving set 23, so as to generate electric power.

There are several ways to practice the embodiments of present invention. The multifunction warning device can be used as a flashlight when the legs 4 are retracted and assembled to a baton body when the lamp 1 is on. In this practice, the baton body may be used as a handle of the flashlight. The multifunction warning device can be used as a triangle traffic sign when the legs are expended outwardly to placed on the ground. In this practice, when the LEDs 451 are on, they can warn other drives of possible dangers. Even when the LEDs are off, the light pervious shell can reflect the lights from other automobiles to warn the drivers thereof of potential dangers. The multifunction warning device can also be an illuminating traffic baton to direct automobiles at night, when the legs 4 are retracted and assembled to a baton body and the LEDs 451 are on. In this practice, the manual power generator 2 is used as a handle of the traffic baton.

Numerous characteristics and advantages of the invention have been set forth in the foregoing description, together with details of the structure and function of the invention, and the novel features thereof are pointed out in appended claims. The disclosure, however, is illustrated only, and changes may be made in detail, especially, in matters of shape, size and arrangement of parts, materials and the combination thereof within the principle of the invention, to the full extend indicated by the broad general meaning of the terms in which the appended claims are expressed.

I claim:

1. A multifunction warning device comprising:
    a manual power generator;
    a lamp secured and electronically connected to said manual power generator;
    a seat connected to said manual power generator, said seat having a socket therein;
    a storage battery having an automobile charging connector removably attached to said socket of said seat;
    plural legs, each said leg comprising:
        a longitude frame having plural LEDs thereon, said longitude frame being pivotally secured to said seat; and
        a light pervious shell fastened to said longitude frame; and
    wherein, said plural legs are in shapes that can be assembled to a baton body when retracted.

2. The multifunction warning device of claim 1, wherein each said leg further comprises a rod pivotally connected to a middle portion of said longitude frame with one end and connected to a ring with the other end.

3. The multifunction warning device of claim 1, further comprising a switch for controlling illuminations of said lamp and said LEDs.

4. The multifunction warning device of claim 1, wherein each said leg further comprises a circuit board mounted on said longitude frame for controlling blinking frequencies of said LEDs.

5. The multifunction warning device of claim 1, wherein said lamp comprises: a bracket connected to said head end of said manual power generator and a lamp head hinged to said bracket.

6. The multifunction warning device of claim 1, further comprising a bottom cover engaged with end portions of said legs for assembling said plural legs.

7. The multifunction warning device of claim 1, wherein said manual power generator comprises a housing with a shape suitable for holding.

8. The multifunction warning device of claim 1, further comprising plural bars engaged with said legs for enhancing strength of said legs.

9. The multifunction warning device of claim 1 wherein said manual power generator comprising:
   a housing;
   a power generating unit installed interior of said housing for generating electric power;
   a driving set installed interior of said housing and formed by a plurality of speed changing gears for driving the power generating unit;
   a handle having an end installed pivotally in front of said housing for driving said driving set; and
   a spring installed within said housing for resisting against said handle, thereby said handle being able to restore automatically.

10. The multifunction warning device of claim 6, wherein said bottom cover is light pervious.

11. The multifunction warning device of claim 9, wherein said manual power generator comprises a fastener installed on said housing for receiving said handle in order the handle to be in alignment with a surface of said housing.

12. The multifunction warning device of claim 10, wherein said legs have threaded portions at the end thereof and said bottom cover has an inner threaded periphery for threadedly engaged with said threaded portions of said legs.

13. A multifunction warning device comprising:
   a manual power generator;
   a lamp secured and electronically connected to a head end of said manual power generator;
   a seat connected to a rear end of said manual power generator, said seat having a socket at a rear end therein;
   a storage battery having an automobile charging connector removably attached to said socket of said seat;
   plural legs, each said leg comprising:
      a longitude frame having plural LEDs thereon, said longitude frame being pivotally secured to said seat;
      a circuit board mounted on said longitude frame for controlling blinking frequencies of said LEDs;
      a light pervious shell fastened to said longitude frame having threaded portion at the end thereof; and
      a rod pivotally connected to a middle portion of said longitude frame with one end and connected to a ring with the other end;
   a switch for controlling illuminations of said lamp and said LEDs; and
   a bottom cover having an inner threaded periphery for threadedly engaged with said threaded portions of said light pervious shells, thereby assembling said plural legs to a baton body.

* * * * *